United States Patent [19]

Bottard

[11] 4,025,767

[45] May 24, 1977

[54] TESTING SYSTEM FOR A DATA PROCESSING UNIT

[75] Inventor: Gilles Jean Marcel Bottard, Paris, France

[73] Assignee: Compagnie Honeywell Bull (Societe Anonyme), Paris, France

[22] Filed: Feb. 4, 1976

[21] Appl. No.: 655,244

Related U.S. Application Data

[63] Continuation of Ser. No. 450,936, March 13, 1974, abandoned.

[30] Foreign Application Priority Data

Mar. 16, 1973  France ............................ 73.09558

[52] U.S. Cl. .................... 235/153 AC; 235/153 AK
[51] Int. Cl.² ....................................... G06F 11/00
[58] Field of Search ............ 235/153 AC, 153 AK; 340/172.5; 445/1

[56] References Cited

UNITED STATES PATENTS

| | | | |
|---|---|---|---|
| 3,519,808 | 7/1970 | Lawder | 235/153 AK |
| 3,780,277 | 12/1973 | Armstrong | 235/153 AC |
| 3,829,842 | 8/1974 | Lnagdon et al. | 340/172.5 |
| 3,831,148 | 8/1974 | Greenwald et al. | 340/172.5 |

Primary Examiner—Charles E. Atkinson
Attorney, Agent, or Firm—Cameron, Kerkam, Sutton, Stowell & Stowell

[57] ABSTRACT

The disclosure describes improved apparatus for setting the states of storage elements in a data-processing system and for responding to the data read out of the storage elements. The apparatus includes a first error detector which enables an initial setting circuit to initially set a first storage element to a predetermined condition in response to an error. The initial setting circuit also disconnects the outputs of a second storage element while that element is receiving reference data and reconnects the outputs of the second storage element after the data has been written into that element. A second error detector monitors the outputs of the first and second storage elements as test signals are conducted to the storage elements.

14 Claims, 6 Drawing Figures

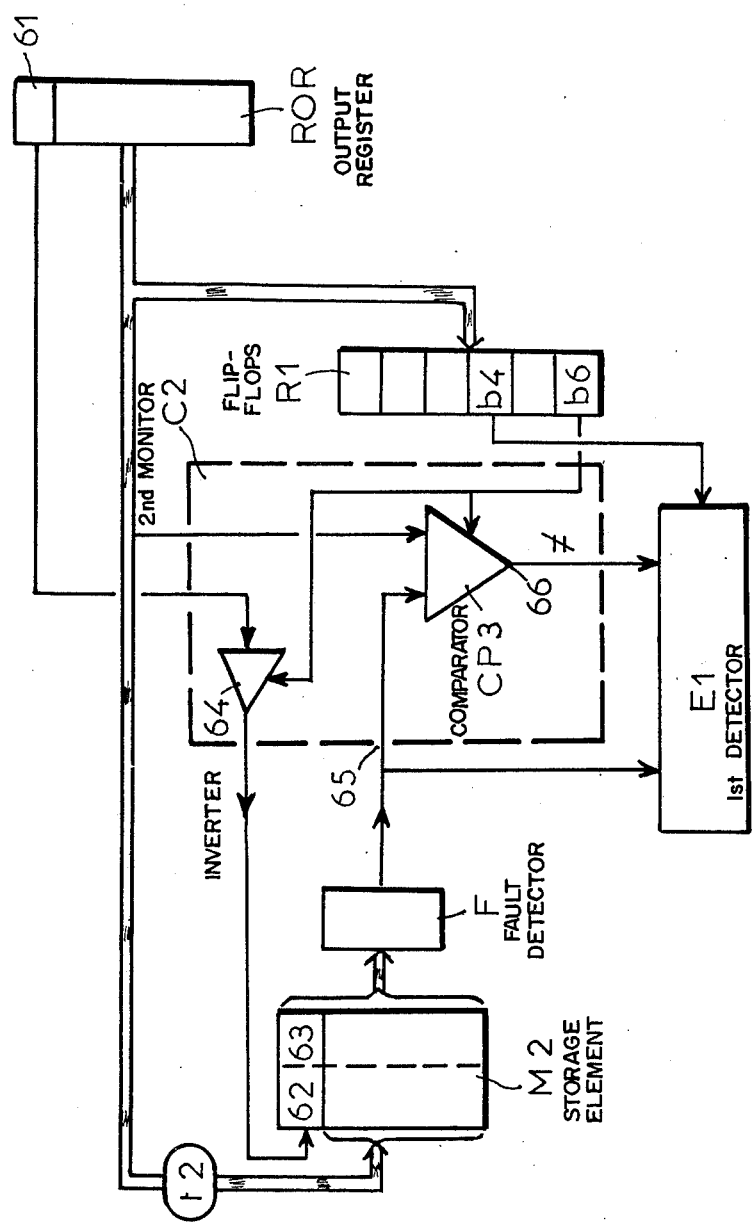

TESTING SYSTEM FOR A DATA PROCESSING UNIT

This is a continuation, of application Ser. No. 450,936, filed Mar. 13, 1974, now abandoned.

BACKGROUND OF THE INVENTION

The present invention relates to a system for testing a data-processing unit which is able to be connected to at least one other data-processing unit and to certain optional members.

The present application is a continuation of the parent U.S. application Ser. No. 450,936, filed Mar. 13, 1974, and further, claims priority under 35 USC 119 to the filing date of the corresponding French patent application.

Data-processing units generally incorporate an erasable store and a permanent store which may contain microprogrammes and testing the units calls for a very large number of operations. These operations generally consist of loading a test programme into the erasable store of the data-processing unit to be tested from a peripheral device, this being done either when the unit has been set to some initial state or in the course of processing when a functional error detector detect an error and the error automatically stops the clock circuits of the unit in question. Data is transmitted to the various elements of the unit to be tested, possibly by means of test microinstructions contained in the permanent store, in order to produce signals representative of the state of these elements. These signals, which may come from functional error detectors, are then compared with reference signals which represent the correct functioning of the elements being tested. Testing each element thus results in a switching signal which either causes the next test operation to be selected if the element which has just been tested is operating correctly, or causes the tests to be suspended or the unit in question to cease processing entirely when an error is detected. When an error is detected the diagnosis to locate the fault is thus based on the elements already tested.

Test systems of this type have a number of drawbacks. Firstly, the fact of having to load a test programme into the erasable store associated with the unit to be tested from a peripheral device necessitates a relatively lengthy operation and makes it especially difficult to trace intermittent faults. Secondly, the loading of the programme may be carried out incorrectly and this may result in omission in the writing of the programme or in erroneous data being written. In this way the testing of the unit may be falsified, as may also be the results obtained. The absence of any means of checking the progress of the tests may also be a source of error which known test systems are incapable of detecting. Nor do such systems contain any means which allow a data-processing unit to be tested from an initial reference state taken of by its storage elements. Thus, the actual initial state of the unit in question may be different from the initial state on the basis of which the reference data in the test programme was calculated, thus falsifying the results of the comparisons by means of which a fault is located. Stopping the clock circuits of the unit in question when an error is detected is also a major inconvenience since any diagnosis process to locate a defective component can only be based on part already tested. The same component may in fact participate in the operation of a number of elements to be tested and the testing of one element may call into play a number of components. If one of these components is defective, the diagnostic process to locate a fault must be performed by a long and painstaking process of dichotomy.

To overcome these drawbacks, one of the objects of the present invention is to make it possible for tests carried out automatically and at high speed on a unit, in the event of an error being detected during processing.

A further object of the invention is to enable all the symptoms required for the immediate location of a fault in a data-processing unit to be collected together.

Another and essential object of the invention is to produce a reliable test system in which all the storage elements of the data-processing unit to be tested are automatically set into a predetermined initial state before the beginning of the testing procedure per se.

SUMMARY OF THE INVENTION

In order to overcome the deficiencies of the prior art and to carry out the foregoing objects, the present invention can be used in connection with a data-processing system including a first data-processing unit that includes first and second storage elements. The first data-processing unit is connectable to a second data-processing unit and optional members, such as peripheral devices. In such a system, according to a preferred feature of this invention, improved apparatus is provided for setting the states of the storage elements and for responding to data read out of the storage elements. This apparatus comprises a first error detector which generates a control signal in response to the transmission of erroneous data from the first or second storage elements. As soon as a control signal is generated, an initial setting circuit sets the first storage element into a first state. In addition, the outputs of the second storage element are disconnected in order to prevent data from being read out of the second storage element while initial reference data is read into the second storage element. After the reference data has been written into the second storage element, the outputs are reconnected so that test data can be written into both the first and second storage elements. A second error detector is also provided for monitoring the outputs of the first and second storage elements as the test data is written into the first and second storage elements. If an error is detected in the operation of a storage element, the second error detector generates a validating signal which facilitates the location and isolation of the error-producing component of the storage element.

BRIEF DESCRIPTION OF THE DRAWINGS

The invention will now be further described, by way of example, with reference to a particular application to a peripheral controller, and with reference to the accompanying drawings, in which.

DESCRIPTION OF THE PREFERRED EMBODIMENT

Figure 1:
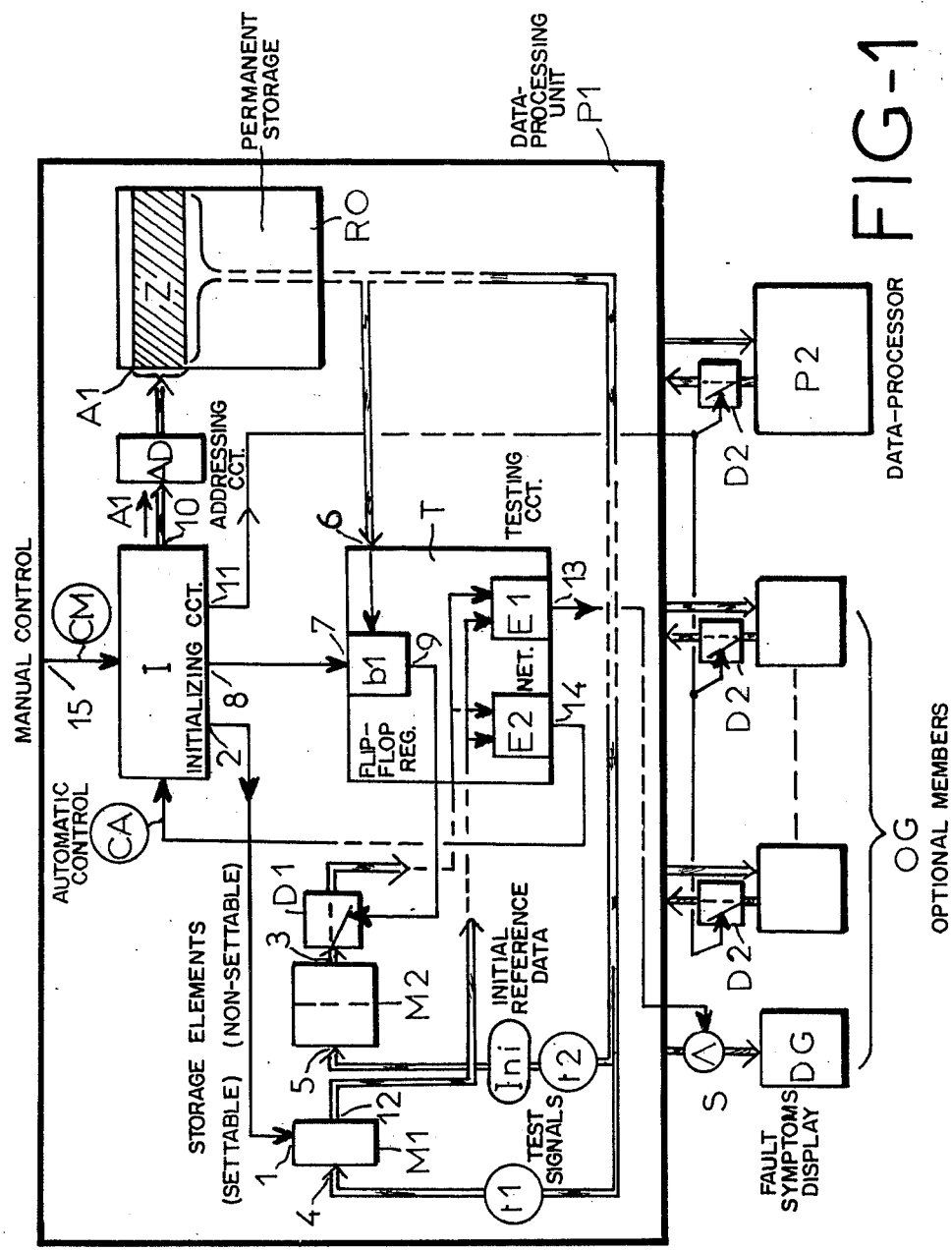
FIG. 1 is schematic diagram of a system according to the invention incorporated in a data-processing unit.

FIG. 1 shows a schematic diagram of a test system according to the invention associated with a data-processing unit P1 which is able to be connected to another data-processing unit P2 and to optional members OG. The functional elements of unit P1 which are employed to process data without affecting the test system according to the invention, either by the way in which they operate of the way in which they are connected, are not shown either in FIG. 1 or in subsequent Figures. Thus there is shown in FIG. 1 only an element M1 and an element M2 of the whole of the storage elements of unit P1, these two elements being formed by bistable elements which may be, respectively, set and not set to an initial condition simultaneously. Similarly, the broken lines represent connections made between functional elements of unit P1 via intermediate elements which are not shown. Input 1 of element M1 is connected to output 2 of the setting unit 1 which resets this element to zero. Output 3 of element M2 is connected to a disconnecting circuit D1. Inputs 4 and 5 of elements M1 and M2 are connected respectively to the outputs of a permanent storage RO belonging to the unit P1, this store being addressed by a circuit AD. Storage RO contains an area reserved for operating microprogrammes, and an area Z, only shown in FIG. 1, situated at an address A1 in the memory, in which are recorded test microprogrammes. The test microprogrammes in area Z are extracted via the outputs of storage RO, these being connected on the one hand to input 6 of the test circuits T, and on the other hand to inputs 4 and 5 of elements M1 and M2 so that reference data (t1) and (t2) can be fed into test the elements in question. The test circuits T contain means $b1$ which are connected via input 6 of circuits T to the outputs of storage RO and via another input 7 to an output 8 of the setting circuit 1. Output 9 of means $b1$ is connected to a circuit D1 for disconnecting the outputs of element M2. Circuit AD for addressing storage RO is connected to an output 10 of circuit 1, of which another output 11 is connected to circuits D2 for disconnecting unit P2 and the members OG connected to unit P1 respectively. Test circuits T further include two detectors E1 and E2 for detecting the errors which occur while unit P1 is being tested and while data is being processed respectively, the inputs of each of the detectors being connected to the various functional elements of unit P1 and in particular to elements M1 and M2 at their outputs 12 and 3. An output 13 of detector E1 is connected to an optional member DG in the group OG, while an output 14 of detector E2 is connected to an input of circuit 1. This output 14 allows detector E2 to transmit an automatic control signal (CA) to circuit 1 in the event of an error being detected while data is being processed. Circuit 1 can also be controlled manually by means of a signal (CM) originating from an input 15 of unit P1 (which may be connected to an operator's control panel, for instance). Thus, when circuit 1 is actuated either manually by means of (CM) or automatically by (CA), a signal is transmitted from its output 2 to element M1 to set the latter to zero. Its output 11 transmits a signal to the various circuits D2 to disconnect the output of unit P2 and the members OG connected to unit P1, thus isolating unit P1 and preventing uncheckable data from being fed into it. Via its output 8, circuit 1 instructs means $b1$ to disconnect the outputs 3 of element M2 to prevent the contents of the bistable components of element M2 from being transferred. Then, via its output 10, circuits 1 transmits a combination of signals representing the address A1 of the storage RO to circuit AD which causes a first sequence of microinstructions contained in area Z of storage RO to be read out from address A1. This first sequence of microinstructions, termed the "initial setting" sequence, is designed to feed initial reference data (Ini) to all the bistable components of element M2 via inputs 5, once the outputs 3 of the element have been disconnected by the means $b1$ connected to circuit D1. Once all the data (Ini) has been fed into the various elements M2, a microinstruction in area Z causes a signal to be transmitted to means $b1$ via input 6 of circuits T to re-connect the outputs 3 previously disconnected by circuit D1. All the storage elements in unit P1 being thus in an initial reference state, the next microinstructions in area Z cause the various functional elements of unit P1 to be tested by transmitting, in particular, test data ($t1$) and ($t2$) to the inputs of elements M1 and M2. If detector E1 detects a fault while unit P1 is being tested, it transmits from its output 13 a validating signal which causes the partial symptoms S shown up by the test microprogramme to be transmitted to a member DG so that the fault in question can be located. When no error is detected by detector E1, all the test microprogrammes contained in area Z are executed without a stop or an interruption. In the event of an error being detected while data is being processed, detector E2 actuates circuit 1 automatically and enables the microprogrammes for testing unit P1 to be executed and the unit's fault condition to be diagnosed from the symptoms S received in member DG.

Figure 2:
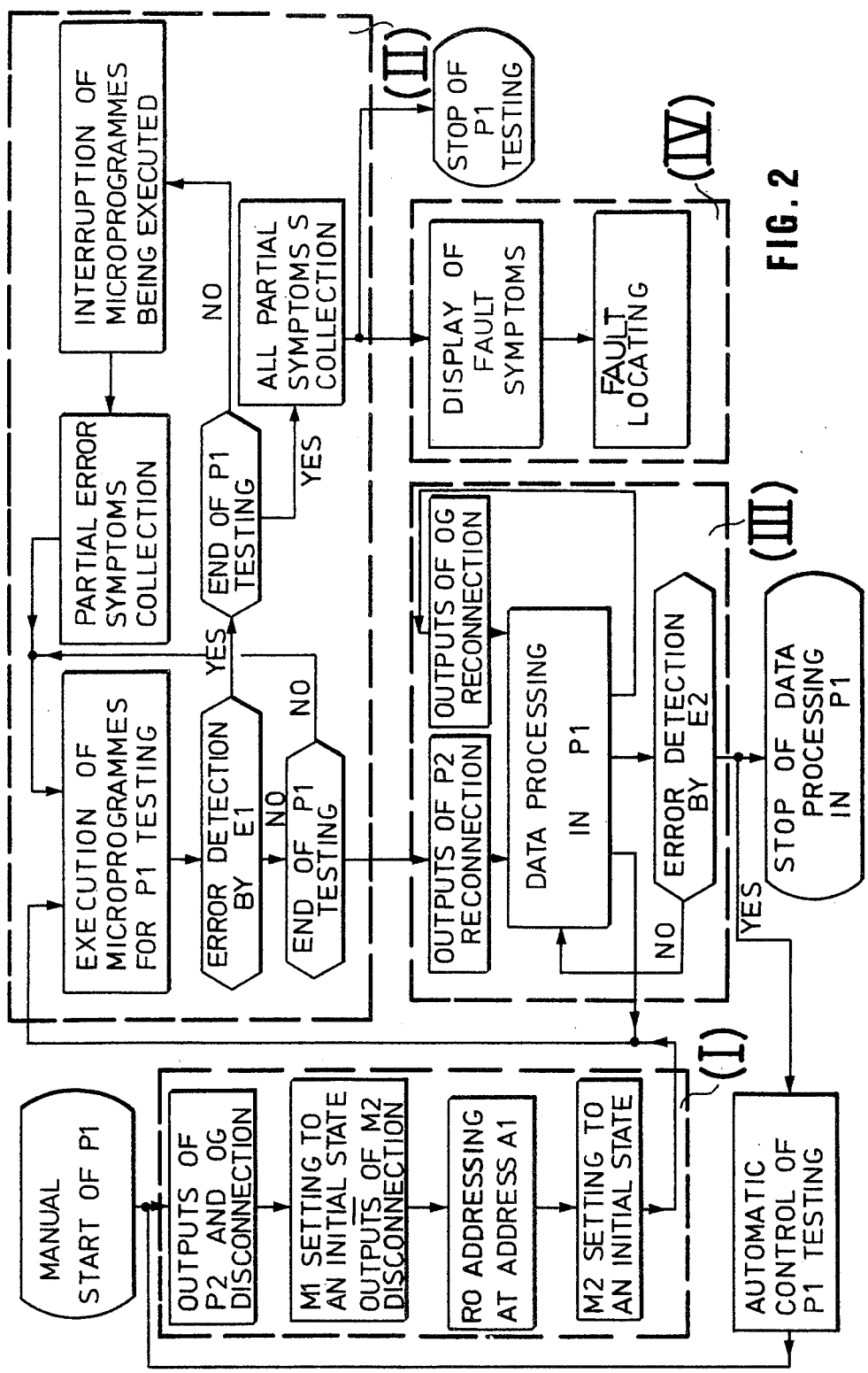
FIG. 2 is a flow chart showing the operation of a test system according to the invention.

The flow chart in FIG. 2 discloses the manner in which the test system according to the invention operates. A manual control for putting unit P1 into operation initiates a First phase (1) in which initial settings are made. This phase first of all consists in disconnecting the outputs of unit P2 and the members OG connected to unit P1, in setting all the elements M1 to their initial state, and in disconnecting the outputs of elements M2, prior to addressing storage RO at the initial address A1 of area Z so that the elements M2 can be set to their initial state before the end of phase 1. After the outputs of the elements M2 have been reconnected the test system goes on to operate in a second phase (II) in which the tests are executed on the functional elements of unit P1. As long as no error is detected in the course of phase II, the microprogrammes for testing all the functional elements of unit P1 are executed without an interruption until all the tests have been completed, which allows a data-processing phase (III) to begin. Any error detected in phase II before the testing of unit P1 has been completed causes the microprogramme being executed to be interrupted. The interruption is followed by microinstructions contained in area Z being executed to collect at least one partial symptom before the test microprogrammes which were interrupted are resumed. In this latter eventuality, when testing of unit P1 has been completed, all the partial fault symptoms S are brought together and displayed in a diagnosis phase (IV) which allows the fault to be traced while unit P1 is not operating. Phase III consists firstly in reconnecting the output of unit P2 which was connected to unit P1 so that unit P1 may again process data in collaboration with unit P2 and with the members OG, which are reconnected as needed. The processing of data thus continues as long as no error is detected. If on the other hand an error is detected, the processing of data is halted and the testing of unit P1 is begun automatically at the initial setting stage (I). It is also possible to interrupt a microprogramme which is being executed in order to address a microprogramme in area Z in storage RO.

Figure 3:
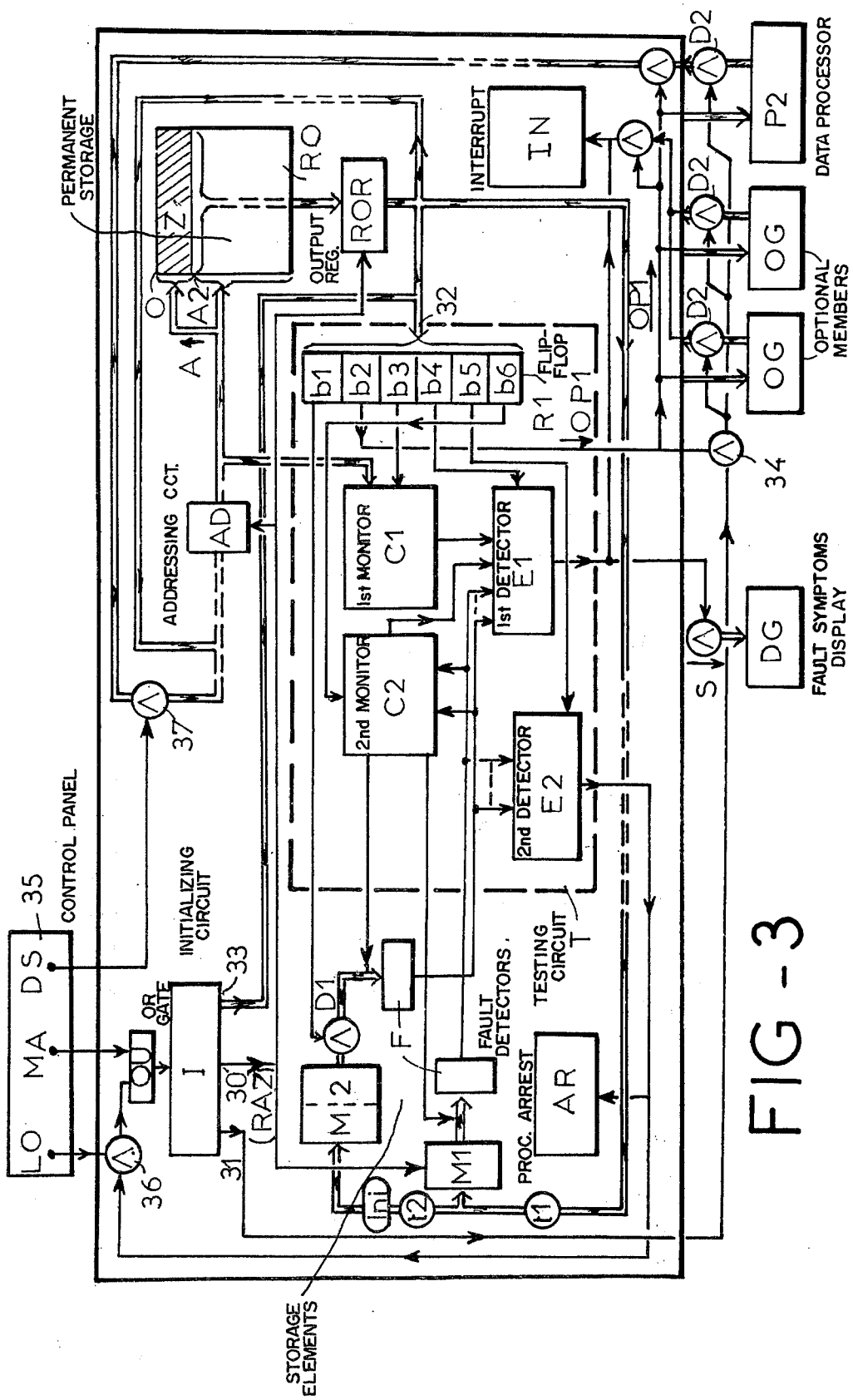
FIG. 3 is an embodiment of a test system according to the invention.

In FIG. 3 the initial address A1 of area Z in storage RO is the first address O of the storage and it is addressed by means of a signal (RAZ) which is transmitted from output 30 of setting circuit 1 in order to reset circuit AD to zero. This same signal RAZ also resets element M1 and an output register ROR associated with storage RO to zero. Circuit 1 is connected at its output 31 to circuits D2 for disconnecting the outputs of unit P2 and members OG. Circuits T are connected at their inputs 32 on the one hand to outputs 33 of circuit 1 and on the other hand to the outputs of register ROR, inputs 32 allowing a register R1 contained in circuits T to be set. Register R1 is formed by a group of flip-flops comprising a first flip-flop, representing means b1, and five others b2, b3, b4, b5, b6. Thus, flip-flop b1, having been set in the first instance via a first input connected to outputs 33 of circuit 1, instructs circuit D1 to disconnect the outputs of element M2. Circuit D1 in FIG. 3 is formed, for example, by AND gates equal in number to the outputs of element M2, all of which are connected to the output of flip-flop b1 and receive from the latter a "zero" binary signal on the instructions of circuit 1. At least the first microinstruction read out from address O in storage RO causes the data (Ini) which sets element M2 to its initial state to be transferred by register ROR. When all the data Ini has been transferred to element M2, a subsequent microinstruction causes register ROR to transmit a signal to a second input of flip-flop $b1$ which instruct circuit D1 to reconnect the output of element M2. In the example given above, the AND gates in circuit D1 then receive a "one" binary signal from flip-flop $b1$. The output of elements M1 and M2 are connected to detectors E1 and E2 (which respectively detect errors occuring while unit P1 is being tested and while data is being processed) via detectors F for detecting functional errors, which are produced in a way familiar in data-processing units in currents use, for example, by use of parity checkers. Detector E1 is validated while unit p1 is being tested as a result of signal being applied to a first input of flip-flop b4 which is connected to outputs 33 of circuit 1, and is invalidated when flip-flop b4 changes state via a second input connected to register ROR, which latter occurs when a last, end-of-test microinstruction located at the last address A2 in area Z in storage RO is read out. Conversely, detector E2 is invalidated while unit P1 is being tested as a result of an initial signal being applied to flip-flop b5 by a first input connected to outputs 33 of circuit 1, and is validated by changing the state of flip-flop b5 by means of a second input connected to register ROR when the last microinstruction, which is located at address A2 in area Z, is read out. The latter microinstruction also allows the state of flip-flop b2 to be altered via one of its inputs (this flip-flop having been set to its initial state through its other input which is connected to outputs 33 of circuit 1) so that, when testing is completed, the flip-flop in question will generate a signal OP1 which indicates that unit P1 is in a good operating state. Signal OP1 is transmitted to unit P2 and members OG through the connection between the output of flip flop b2 and the outputs of unit P1 which are connected to unit P2 and members OG, the signal indicating to them that unit P1 is ready to process data. The disconnection circuits D2 in FIG. 3 are produced in the same way as circuit D1 for example, that is to say as a group of AND gates which are all connected to output 31 of circuit 1. When this is the case, an AND gate 34, one input of which is connected to output 31 of circuit 1 and another input of which is connected to the output of flip flop b2, allows circuits D2 to be validated by circuit 1 as long as the gate does not receive signal OP1. It is likewise possible for only the outputs of unit P2 which are connected to unit P1 to be reconnected as a result of signal OP1, known means which are not shown being used for this. When this is the case, the outputs of members OG which are connected to unit P1 are then only connected to suit the processing operation to be executed. Generally speaking a processing unit such as unit P1 in FIG. 3 is controlled externally from a manual control panel such as panel 35 in FIG. 3. This panel has a first control MA to control circuit 1 manually via a first input of an OR gate when unit P1 is put into operation. A second control LO allows unit P1 to process data by operating in a so-called "local" mode in relation to unit P2, that is to say independantly of the latter unit. In this case an AND gate 36, which is connected to control LO at a first input and to the output of detector E2 at a second input, allows circuit 1 to be controlled automatically in the "local" mode by means of an output connected to a second input of the said OR gate. When the whole of unit P1 has been tested without any error being detected by detector E1, transmitting signal OP1 to unit P2 and members OG enables unit P1 to process either "locally" or "remotely". The latter case is equivalent to unit P1 operating in conjunction with unit P2. With this mode of processing, which only takes place after signal OP1 has appeared, unit P2 is allowed to address storage RO (and in particular its area Z) by means of a circuit 37 which may be formed by a group of AND gates on input of which is connected to a control DS on panel 35. In FIG. 3, circuits T also incorporate a first monitor C1 for monitoring the progress of the testing of unit P1, the monitor being connected on the one hand to the outputs of circuit AD and on the other hand to the output of flip flop b3. Flip flop b3, which receives its initial setting through a first input connected to outputs 33 of circuit 1, validates monitor C1 while unit P1 is being tested and invalidates it on completion of the test when the last microinstructions is read out from address A2 by register ROR. A second monitor C2 forming part of circuits T has certain of its inputs and outputs connected to various functional error detectors F so that it can check their operation while unit P1 is being tested. Monitor C2 is controlled by flip flop b6 only during testing as a result of the flip flop in question receiving its initial setting from circuit 1 and having its contents altered alternately by register ROR to suit the various detectors F to be monitored.

In the same way way as the functional error detectors F in unit P1, monitors C1 and C2 are connected to detector E1. Thus, in addition to purely functional errors in unit P1, detector El also allows anomalies to be picked up, either in the way the tests are carried out, or in the way in which detectors F operate. If detector E1 detects an error while unit P1 is being tested, it transmits from its output an order to an interrupt circuit IN which will momentarily interrupt the microprogramme being executed, so that the partial symptoms of the fault will be collected, together with a signal to allow members DG to display the symptoms S required to locate the fault. If detector E2 detects an error while unit P1 is processing data, it transmits an order to data processing arrest circuit AR for halting processing which automatically arrests the clock circuits of unit P1, these not being shown in FIG. 3.

Figure 4:
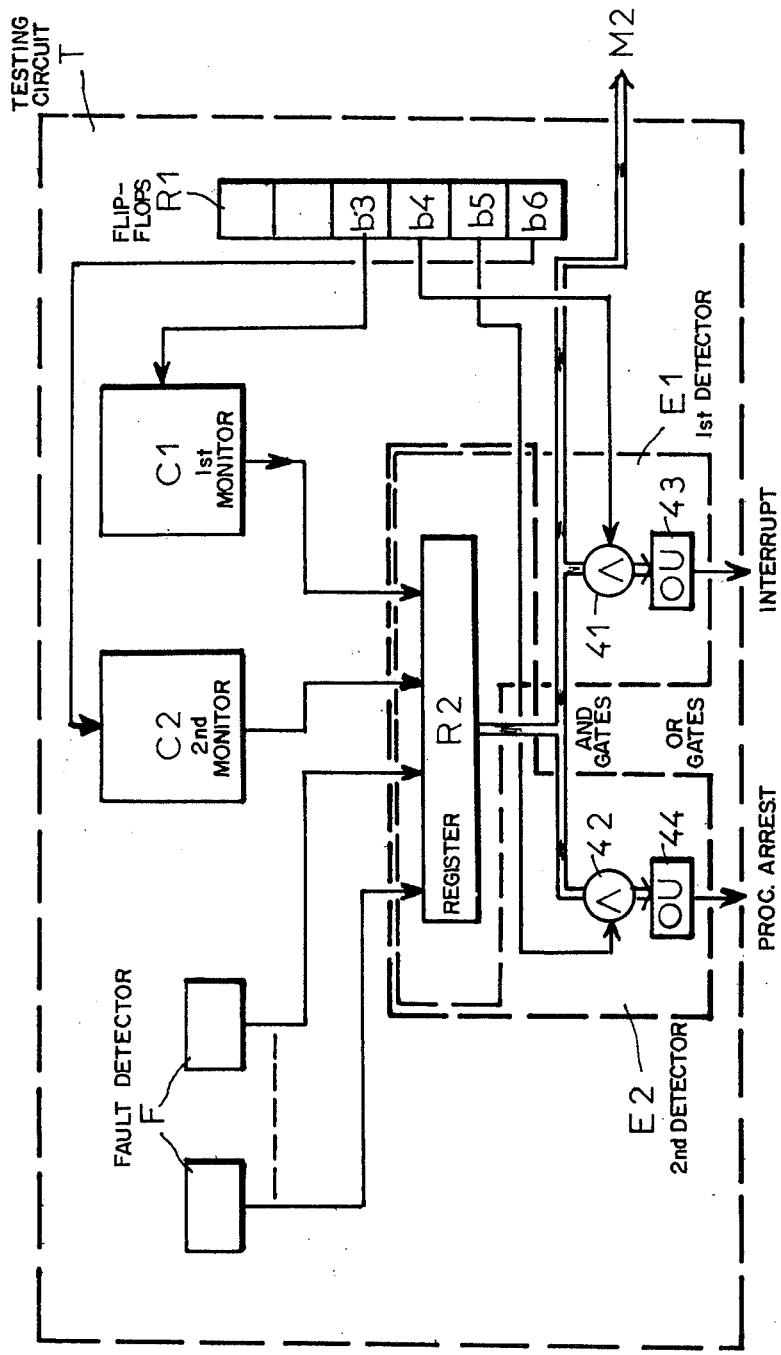
FIG. 4 is an embodiment of the error detectors E1 and E2 associated with a test system according to the invention.

An embodiment of detectors E1 and E2 is shown in FIG. 4. Detectors E1 and E2 share a register R2 formed by a group of flip flops the respective inputs of which are connected to the various detectors F and to monitors C1 and C2. The outputs of register R2 are connected on the one hand to a first group of AND gates 41 forming part of detector E1 and on the other hand to a second group of AND gates 42 forming part of detector E2. Gates 41 are also connected to the output of flip flop b4 and gates 42 are connected in a similar way to the output of flip flop b5. The outputs of gates 41 are connected to the input of an OR gate 43 which forms part of detector E1 and the outputs of gates 42 are connected to the inputs of an OR gate 44 forming part of detector E2. The various flip flops in register R2 store logic state 1 if either the elements of unit P1 or detector F operate incorrectly or if the tests take an abnormal course. Monitors C1 and C2 are validated by flip flops b3 and b6 respectively while unit P1 is being tested and the content of register R2 is transmitted to OR gate 43 by a validating signal which is emitted by flip flop b4 in the course of testing. OR gate 43 gives a signal at its output in the course of testing when one of the detectors F or one of the monitors C1 of C2 transmits a signal to register R2. Since monitors C1 and C2 are invalidated while data is being processed, the various flip flops in register R2 store only the operating state of the functional elements of unit P1, with the logic 1 state being equivalent to these parts operating incorrectly. When a detector F transmits a signal to register R2 while data is being processed, the content of the register in question is transmitted, as a result of flip flop b5 validating gates 42. to OR gate 44, which emits a signal from its output. In the embodiment of detectors E1 and E2 shown in FIG. 4, OR gate 43 is connected to circuit IN shown in FIG. 3 and OR gate 44 is connected to circuit AR in FIG. 3.

Figure 5:
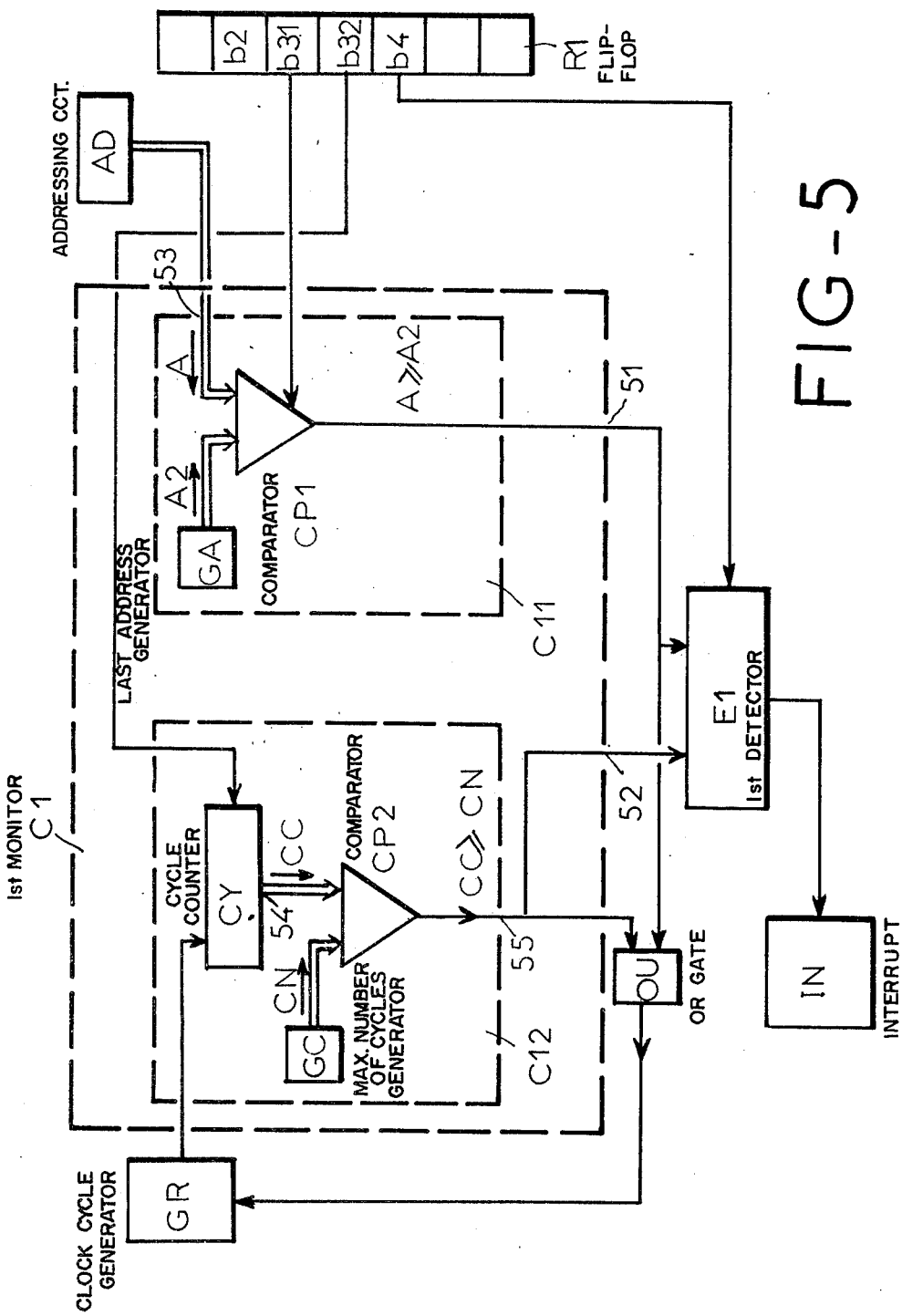
FIG. 5 is an embodiment of a monitor C1 for monitoring the progress of the tests carried out by a test system according to the invention, and, FIG. 6 is an embodiment of a monitor C2 for monitoring the detectors of functional errors in a data-processing unit which is to be tested using a test system according to the invention.

Monitor C1, which is shown in FIGS. 3 and 4, is connected to detector E1 in FIG. 5 by two outputs 51 and 52. The outputs of address circuit AD are connected to inputs 53 of a first circuit C1 forming part of monitor C1. Circuit C11 includes a comparator CP1 the inputs of which are connected on the one hand to inputs 53 of circuits C11 and on the other hand to a last address generator GA forming part of the said circuit which transmits address A2 to comparator CP1 in the form of a combination of signals. Comparator CP1 is validated by a flip flop b31 belonging to the register R1 in FIGS. 3 and 4, and, each time storage RO is addressed while unit P1 is being tested, it compares address A2 with the address A read out from storage RO by register ROR. Comparator CP1 gives a signal at output 51 of monitor C1 when address A is such that A ⩾ A2, indicates that while testing is going on, memory RO has been addressed elsewhere than in area Z. Monitor C1 also incorporates a clock cycle second monitor circuit C12 connected to a generator GR which provides a clock cycle for a microinstruction to be executed, such a generator GR usually forming part of the clock circuits of a data-processing unit such as unit P1 in FIGS. 1 and 3. Circuit C12 contains a cycle counter CY which is provided with a clock cycle by generator GR each time a microinstruction is executed and is validated at least once while unit P1 is being tested by a flip flop b32 which forms part of register R1 in FIGS. 3, 4 and 5. Each time it is validated, counter CY emits from its output 54 a combination of signals representing the current number of cycles CC, which is a function of the elapsed time between the time at which the present validation of counter Cy began and the time at which execution of the current microinstruction was completed. A comparator CP2, which forms part of circuit C12, is connected at its inputs on the one hand to output 54 of counter CY and on the other hand to a maximum number of cycles generator GC which generates a combination of signals which represent a number of cycles CN itself representing sufficient time for the monitor C12 to execute all the microinstructions contained in the present monitoring sequence. Comparator CP2 emits a signal at output 52 of monitor C1 when the number of cycles CC is such that CC ⩾ CN, which indicates that microinstructions have been repeated in an abnormal way. When an error occurs while the tests are going on, detector E1 in FIG. 5 makes it possible to determine whether it is a matter of storage RO being wrongly addressed or whether there has been an abnormal repetition in executing the microinstructions in area Z. To prevent counter CY counting on interruptedly as a result of an error occurring while unit P1 is being tested, output 55 of comparator CP2 is connected to generator GR so that it can transmit a stop signal to the generator when CC ⩾ CN. As an example it may be noted that circuit 12 ceases to be validated particularly when testing of the erasable store of a processing unit such as unit P1 takes too long a time.

To detect functional errors in a data-processing unit, a parity (or imparity) code signal is generally associated with each combination of signals representing data to be transferred from one part of the unit to another. FIG. 6 shows the storage element M2 from FIGS. 1 and 3 which is to be tested by means of the data ($t2$) transmitted to its inputs by register ROR. By means of a flip flop 61 in register ROR, a parity (or imparity) code signal is transmitted to each of flip flops 62 and 63 in element M2 simultaneously with the data ($t2$). The data stored in element M2 is then transferred to a detector F for detecting functional errors in this element, the detector in question being shown in FIG. 6 as a parity (or imparity) code monitor. Detector E1 connected to this monitor F enables an error due to the element M2 shown in this figure to be detected. To ensure that the information given by monitor F is accurate, an inverter circuit 64, which forms parts of monitor C2 in FIGS. 3 and 4, is inserted between flip flop 61 and element M2. Circuit 64 is instructed by flip flop b6 in register R1 in FIGS. 3 and 4 to transmit an inverted parity (or imparity) code signal to element M2 simultaneously with data ($t2$). If monitor F has received erroneous data, the signal at its output will be transmitted to an input 65 of monitor C2 in FIG. 6. This figure shows an embodiment which makes it possible to check if monitor F is capable of detecting an erroneous item of data introduced into the functional element with which it is associated. These means are formed by a comparator CP3 which is validated by a flip flop b6 and one input of which is connected to the output of register ROR which transmits to it a reference signal representing monitor F when in good order. By a signal to detector E1 from output 66 of comparator CP3, monitor C2 indicates whether the parity (or imparity) code monitor F is defective.

The means which allow the various partial symptoms to be collected each time an error is detected while all the functional elements of the unit are being tested, are formed by at least one microinstruction sequence contained in area Z of storage RO which is addressed if there is a signal at the output of detector E1. Where detectors E1 and E2 take the form shown in FIG. 4, these microinstructions may cause a read-out from register R2. Each time an error is detected the content of the register R2 is transferred to a group of registers in unit P1 the capacity of which is sufficient to hold all the partial symptoms S which show the existence of a fault.

Normally faults are located by using a faultfinding manual drawn up beforehand which contains all the faults which may be anticipated in unit P1 together with their associated partial symptoms. To draw up such a manual every possible fault is simulated so that all the partial symptoms S of the fault can be produced by testing each of the elements of unit P1 using the test system according to the invention.

The detailed description above relates to a test system which can be incorporated in any data-processing system which contains a permanent storage. For this reason the functional elements that normally comprise a unit such as the unit P1 whose test system has been described have only been mentioned where they make it easier for the present invention to be understood. Similarly, the means which enable a fault to be located have not been described in detail when they fall outside the scope of the present invention.

The test system according to the present invention could advantageously be used in a preferred, high-performance, embodiment which detects faults at the level of the smallest replaceable part, such as an integrated circuit or a discrete component.

Statistical studies performed to establish all the failures which might be expected showed that, in the majority of cases, only one failure was likely to occur at any given moment. The test system according to the invention is produced on this theoretical basis and gives highly satisfactory results for failure which persist for a time at least equal to the time normally taken to carry out all the microprogrammes associated with the test system. Finally, bearing in mind the rapidity with which the system comes into operation if an error is detected while data is being processed, it is also possible for intermittent failures to be located using such a test system.

We claim:

1. In a data-processing system including first and second data-processing units, optional members and switch means for connecting said first data-processing unit to said second data-processing unit and to said optional members, said first data-processing unit comprising a permanent storage containing a sequence of test signals, a first storage element and a second storage element each including bistable components respectively settable and non-settable into predetermined initial states, improved apparatus incorporated into said first data-processing unit for setting the states of the storage elements and for responding to the data read out of the storage elements, comprising:

first error detector means operative during data processing for generating a control signal in response to the transmission of erroneous data from the first or second storage elements;

initial setting means operatively connected to said first and second storage elements for setting said first storage element into said initial state in response to the control signal, for disconnecting the outputs of said second storage element to prevent data from being read out of the second storage element while initial reference data derived from a test signal read out of said permanent storage is written into said second storage element, and for reconnecting the outputs of said second storage element after the initial reference data has been written into said second storage element;

conductor means connecting said permanent storage to the inputs of the first and second storage elements for transmitting test signals; and second error detector means connected to the outputs of the first and second storage elements and operative during testing for monitoring the outputs of the first and second storage elements as the test signals are conducted to the conductor means and for generating a validating signal in response to the detection of an error, so that a fault detected during testing can be identified.

2. Apparatus according to claim 1, and further comprising disconnect means for disconnecting the second data processing unit and the optional members from the first data processing unit in response to a disconnect signal generated by the initial setting means.

3. Apparatus according to claim 1, wherein the first and second error detector means are alternately validated so that the occurrence of an error in the first data processing unit is detected by the first error detector means during data processing and the occurrence of an error in the first data processing unit is detected by the second error detector means during unit testing.

4. Apparatus according to claim 3, and further comprising monitor means for monitoring functional fault detectors respectively associated with the first and second storage elements, the monitor means being connected by at least one output to the second error detector means while the first data processing unit is being tested.

5. Apparatus according to claim 1, wherein the first and second error detector means share a common register formed by a group of flip-flops which store the defective, operating state of various elements of the first and second storage elements during the testing of the first data processing unit.

6. Apparatus according to claim 5, wherein the first and second error detector means further include(s) respectively:

a group of AND gates respectively connected to the outputs of the register; and an OR gate connected to the outputs of the group of AND gates.

7. In a data-processing unit connectable to optional peripheral members and to at least another dataprocessor, said unit comprising:

an addressable permanent storage, and a plurality of functional elements including erasable storage elements, wherein an area of said permanent storage contains a sequence of test signals operative for testing all aforesaid elements for all anticipated faults, and wherein said storage elements comprise bistable components and are first and second sets thereof, according as their components are respectively settable and non-settable to a predetermined initial state, an improved apparatus for initiating a fault testing procedure in said unit, essentially comprised of an initializing circuit and of a testing circuit operatively connected to one another, to said permanent storage and to said storage elements, switch means for connecting said data-processing unit to said other data-processing unit and to said optional peripheral members, said initializing circuit having manual and automatic control inputs both operative for enabling first, second, third and fourth outputs thereof, said first output being applied to said switch means for disconnecting said data-processing unit from said peripheral members and said other data-processor, said second output addressing said permanent storage for sequential reading out of said test signals from the first one, said third output setting said storage elements of said first set into said predetermined initial state, and said fourth output controlling said test circuit;

said testing circuit including essentially first and second bistable register means each having control inputs connected to said fourth output of said initializing circuit and to the output of said permanent storage, and first and second detector means having respective inputs connected to said register means and to said storage elements, said first register means being set by said fourth output of said initializing circuit for disconnecting the outputs of said storage elements of said second set in order to prevent the contents thereof from being read out while initial reference data derived from said first test signal are written in said storage elements to put same in a predetermined initial reference state, said first register means being thereafter reset by a subsequent test signal for reconnecting the outputs of said storage elements, said second register means being set by said fourth output of said initializing circuit for enabling said first detector means and disabling said second detector means during said testing procedure, and being thereafter reset by the last test signal for conversely disabling said first detector means and enabling said second detector means during data processing, said first detector means having an output connected to an enable input of a fault identifying device associated with said data-processing unit, and said second detector means having an output connected to said automatic control input of said initializing circuit, whereby said fault testing procedure is initialized by said apparatus upon manual or automatic control respectively before and when data are processed, and proceeds from predetermined initial states of every aforesaid storage elements, without consideration of their previous states and without interference on the part of said peripheral members and said other data-processor.

8. Apparatus according to claim 7, wherein said first and second detector means respectively control a testing procedure interrupt circuit and a data processing arrest circuit incorporated into said unit.

9. Apparatus according to claim 7, wherein inputs of said first and second detector means are connected to the outputs of functional fault detectors respectively associated with said storage elements, and wherein said testing circuit further include first and second monitor means validated by said second register means and having respective outputs controlling said first detector means;

said first monitor means being connected to addressing circuits of said permanent storage for monitoring the progress of said testing procedure, and said second monitor means being connected to said functional fault detectors for monitoring the operation thereof.

10. Apparatus according to claim 9, wherein said first and second detector means share a common group of input flip-flops respectively connected to said functional fault detectors and to said first and second monitor means, and include each a respective group of AND gates connected to the outputs of said flip-flops and of said second register means, and a respective OR gate connected to the outputs of said AND gates.

11. Apparatus according to claim 9, wherein said first monitor means comprises first comparator means having inputs connected to said addressing circuits of said permanent storage and to a last address generator, and second comparator means having inputs connected to a clock circuit operative during said testing procedure and to a maximal number of cycles generator, the outputs of both comparator means being connected to said first detector means.

12. Apparatus according to claim 9, wherein said second monitor means comprise an inverter for inverting a checking signal incorporated to the data transmitted from said permanent storage to said storage elements during said testing procedure, and third comparator means having inputs connected to said permanent storage and to the functional fault detectors associated with said storage elements, the output of said comparator means being connected to said first detector means.

13. Apparatus according to claim 7, wherein said testing circuit includes an array of flip-flops having control inputs connected on the one hand to said fourth output of said initializing circuit and on the other hand to the output of said permanent storage, namely a first flip-flop comprising the aforesaid first register means, a second flip-flop cooperating with said initializing circuit for disconnecting said peripheral members and data-processor, third and fourth flip-flops for controlling said first monitor and detector means, respectively, and fifth and sixth flip-flops for controlling said second detector and monitor means, respectively, said fourth and fifty flip-flops comprising the aforesaid second register means.

14. In a data-processing system including first and second data-processing units, optional members, and means for connecting said first data-processing unit to said second data-processing unit and to said optional members, said first data-processing unit including permanent storage means in which are stored microprograms, first and second sets of storage elements, a manually-controllable circuit connected by outputs to said first set of storage elements for setting said first set of storage elements to an initial state before data is processed in said first data-processing unit and to said permanent storage means for initiating the reading of microprograms stored therein, a system for testing the functional elements of said first data-processing unit, comprising:

a. said permanent storage means having a predetermined area in which are stored test microprograms;

b. initial setting means for initiating the reading out of said test microprograms, for applying test signals from said permanent storage means to said functional elements of said first data-processing unit for testing said functional units and for collecting signals from said functional units of all the symptoms associated with the faults occurring in said functional units of said first data-processing unit;

c. test circuits connected to an input and an output of said first initial setting means and to the outputs of said permanent storage means, said test circuits comprising:

1. first error detector means, connected to said first and second sets of storage elements, to said functional elements of said first data-processing unit and to said initial setting circuit, said first detector including means for sending a control signal to said first initial setting means in response to the transmission of erroneous data from any of said functional elements during data processing thereby;

2. second initial setting means operative in a first, automatic mode to receive a signal from said first initial setting means indicative of erroneous data transmission during data-processing and in a second, manual mode before data is processed, said second initial setting means including means for successively disconnecting and reconnecting said second set of storage elements to said permanent storage means before and after initial reference data are written into said second set of storage elements from said permanent storage generating means;

3. second error detector means connected to said first and second sets of storage elements and to said other functional elements of said first data-processing unit, said second error detector means including means for generating a disabling signal in response to the transmission of erroneous data from said functional elements during testing; and 4. conductor means connecting said permanent storage means to said functional elements of said first data-processing unit for transmitting test signals from said permanent storage means corresponding to the reading out of test microprograms as initiated by said first initial setting means, said first initial setting means operative in a first, manual mode before data is processed and in a second, automatic mode during data-processing when an error is detected by said first error detector means.

* * * * *

UNITED STATES PATENT OFFICE
CERTIFICATE OF CORRECTION

Patent No. 4,025,767     Dated May 24, 1977

Inventor(s) GILLES JEAN MARCEL BOTTARD

It is certified that error appears in the above-identified patent and that said Letters Patent are hereby corrected as shown below:

Column 11, line 63, "initialized" should read --initiated--.

Column 12, line 61, "fifty" should read --fifth--.

Signed and Sealed this

Eighth Day of November 1977

[SEAL]

Attest:

RUTH C. MASON
Attesting Officer

LUTRELLE F. PARKER
Acting Commissioner of Patents and Trademarks